United States Patent
Isami et al.

(10) Patent No.: US 12,533,964 B2
(45) Date of Patent: Jan. 27, 2026

(54) ELECTRIC VEHICLE

(71) Applicant: TOYOTA JIDOSHA KABUSHIKI KAISHA, Toyota (JP)

(72) Inventors: Yoichiro Isami, Mishima (JP); Yoshio Itou, Susono (JP); Hiroyuki Amano, Susono (JP); Tatsuya Imamura, Okazaki (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/970,078

(22) Filed: Dec. 5, 2024

(65) Prior Publication Data
US 2025/0091449 A1   Mar. 20, 2025

Related U.S. Application Data

(63) Continuation of application No. 18/626,842, filed on Apr. 4, 2024, which is a continuation of application No. 17/350,786, filed on Jun. 17, 2021.

(30) Foreign Application Priority Data

Aug. 7, 2020 (JP) .................. 2020-135075

(51) Int. Cl.
*B60L 15/20* (2006.01)
*B60K 1/00* (2006.01)
(Continued)

(52) U.S. Cl.
CPC .............. *B60L 15/20* (2013.01); *B60K 1/00* (2013.01); *B60K 20/02* (2013.01); *B60K 23/02* (2013.01);
(Continued)

(58) Field of Classification Search
CPC .......... B60K 1/00; B60K 23/02; B60K 20/02; B60K 26/021; B60K 2026/023; G05B 17/02; B60L 2250/26; B60L 15/20
See application file for complete search history.

(56) References Cited

U.S. PATENT DOCUMENTS 5,934,145 A    8/1999 Ersoy et al.
11,554,677 B2  1/2023 Isami
(Continued)

FOREIGN PATENT DOCUMENTS

CN   105864313 A   8/2016
CN   108475080 A   8/2018
(Continued)

OTHER PUBLICATIONS

Feb. 11, 2025 Office Action issued in U.S. Appl. No. 18/626,842.
(Continued)

*Primary Examiner* — Paul N Dickson
(74) *Attorney, Agent, or Firm* — Oliff PLC

(57) ABSTRACT

The controller of the electric vehicle is configured to control the torque of the electric motor using the MT vehicle model based on the operation amount of the accelerator pedal, the operation amount of the pseudo-clutch pedal, and the shift position of the pseudo-shifter. The electric vehicle also includes a pedal reaction force generator that generates a pedal reaction force in response to the operation of the pseudo-clutch pedal using by the operating of the reaction force actuator. The controller is configured to store the pedal reaction force characteristic simulating the characteristic of the pedal reaction force according to the operation of the clutch pedal. Then, the controller is configured to control the pedal reaction force output by the pedal reaction force generator in response to the operation of the pseudo-clutch pedal using the stored pedal reaction force characteristic.

2 Claims, 13 Drawing Sheets

(51) Int. Cl.
  *B60K 20/02* (2006.01)
  *B60K 23/02* (2006.01)
  *B60K 26/02* (2006.01)
  *G05B 17/02* (2006.01)

(52) U.S. Cl.
  CPC ............ *B60K 26/021* (2013.01); *G05B 17/02* (2013.01); *B60K 2026/023* (2013.01); *B60L 2240/423* (2013.01); *B60L 2240/463* (2013.01); *B60L 2240/48* (2013.01); *B60L 2240/80* (2013.01); *B60L 2250/26* (2013.01)

(56) References Cited

U.S. PATENT DOCUMENTS

| | | |
|---|---|---|
| 2003/0085577 A1 | 5/2003 | Takaoka et al. |
| 2004/0163860 A1 | 8/2004 | Matsuzaki et al. |
| 2004/0251095 A1 | 12/2004 | Simard et al. |
| 2004/0259687 A1 | 12/2004 | Ritter et al. |
| 2005/0182609 A1 | 8/2005 | Kurrle et al. |
| 2008/0060861 A1 | 3/2008 | Baur et al. |
| 2008/0146407 A1 | 6/2008 | Tuckfield |
| 2010/0250085 A1 | 9/2010 | Sugano et al. |
| 2012/0079912 A1 | 4/2012 | Leone et al. |
| 2012/0083958 A1 | 4/2012 | Ballard |
| 2012/0150371 A1* | 6/2012 | Swales ................. B60W 10/06 180/65.265 |
| 2013/0035817 A1 | 2/2013 | Bahar et al. |
| 2014/0200779 A1* | 7/2014 | Aoki .................. B60W 50/082 477/44 |
| 2015/0199955 A1 | 7/2015 | Draganic |
| 2015/0298681 A1 | 10/2015 | Tanaka et al. |
| 2015/0360672 A1 | 12/2015 | Hayashima et al. |
| 2016/0311321 A1 | 10/2016 | Maruyama et al. |
| 2017/0168519 A1 | 6/2017 | Alf et al. |
| 2017/0351291 A1 | 12/2017 | Schoenfuss et al. |
| 2018/0202385 A1 | 7/2018 | Miwa et al. |
| 2018/0281619 A1 | 10/2018 | Suzuki et al. |
| 2018/0340481 A1 | 11/2018 | Miwa et al. |
| 2018/0340581 A1 | 11/2018 | Kitai |
| 2018/0373285 A1 | 12/2018 | Maurel |
| 2019/0111788 A1* | 4/2019 | Fujita .................... B60K 35/60 |
| 2019/0129462 A1* | 5/2019 | Kim ........................ G05G 1/44 |
| 2020/0001711 A1 | 1/2020 | Burke et al. |
| 2021/0232173 A1* | 7/2021 | Medeiros ............... G05G 1/506 |
| 2022/0041155 A1 | 2/2022 | Isami et al. |
| 2023/0060925 A1 | 3/2023 | Kinouchi et al. |

FOREIGN PATENT DOCUMENTS

| | | |
|---|---|---|
| CN | 109177742 A | 1/2019 |
| CN | 109249813 A | 1/2019 |
| JP | H08-161069 A | 6/1996 |
| JP | 2018-166386 A | 10/2018 |
| JP | 2018-191366 A | 11/2018 |
| WO | 2019/130762 A1 | 7/2019 |

OTHER PUBLICATIONS

Mar. 3, 2025 Notice of Allowance issued in U.S. Appl. No. 17/350,786.
U.S. Appl. No. 17/356,086, filed Jun. 23, 2021 in the name of Yoichiro Isami et al.
May 2, 2023 Non-Final Rejection Issued in U.S. Appl. No. 17/356,086.
Jul. 26, 2023 Notice of Allowance issued in U.S. Appl. No. 17/356,086.
Machine translation of: Sun et al., Chinese Patent Document CN 109249813 (patent document published 2019, translation generated 2023) (Year: 2023).
Dec. 28, 2023 Office Action issued in U.S. Appl. No. 17/350,786.
Apr. 16, 2024 Office Action issued in U.S. Appl. No. 17/350,786.
Sep. 18, 2024 Office Action issued in U.S. Appl. No. 18/626,842.
Machine Translation of Yang et al. (CN 109177742 B, cited by applicant). Generated Sep. 2024 (Year: 2024).
Aug. 9, 2024 Advisory Action issued in U.S. Appl. No. 17/350,786.
Aug. 29, 2024 Office Action issued in U.S. Appl. No. 17/350,786.

* cited by examiner

ELECTRIC VEHICLE

CROSS-REFERENCE TO RELATED APPLICATION

This is a continuation of U.S. patent application Ser. No. 18/626,842 filed Apr. 4, 2024, which is a continuation of U.S. patent application Ser. No. 17/350,786 filed Jun. 17, 2021, now U.S. Pat. No. 12,351,038 which claims priority under 35 U.S.C. § 119 to Japanese Patent Application No. 2020-135075, filed Aug. 7, 2020, the contents of which applications are incorporated herein by reference in their entirety.

BACKGROUND

Field

The present disclosure relates to an electric vehicle in which an electric motor is used as a power source for traveling.

Background Art

Torque characteristics of an electric motor used as a power source for traveling in an electric vehicle (EV: Electric Vehicle) are greatly different from those of an internal combustion engine used as a power source for traveling in conventional vehicles. Due to the differences in the torque characteristics of the power source, conventional internal combustion engine vehicles require a transmission, while EVs generally do not have the transmission. Of course, EVs are not equipped with a manual transmission (MT: Manual Transmission) that switches gear ratios by the driver's manual operation. Therefore, there is a great difference in driving feeling between driving of conventional vehicles with MT (hereinafter referred to as MT vehicles) and driving of EVs.

On the other hand, the electric motor can control the torque relatively easily by controlling the applied voltage and magnetic field. Therefore, in the electrical motor, it is possible to obtain the desired torque characteristics within the operating range of the electric motor by implementing appropriate control. Taking advantage of this feature, a technique to simulate the torque characteristics peculiar to MT vehicles by controlling the torque of EVs has been proposed so far.

JP 2018-166386 discloses a technology to produce a pseudo shift change in a vehicle that transmits torque to the wheels by a drive motor. In this vehicle, torque fluctuation control is performed to decrease the torque of the drive motor by a set variation amount and then increase the torque again in a predetermined time at a predetermined trigger defined by the vehicle speed, accelerator pedal opening degree, accelerator opening speed, or brake depression amount. As a result, the sense of discomfort given to drivers who are accustomed to vehicles having a stepped transmission is suppressed.

SUMMARY

However, in the above technique, it is impossible to determine the timing of the torque fluctuation control simulating the shifting operation voluntarily by the driver's own operation. Particularly for drivers who are accustomed to driving MT vehicles, a pseudo-shifting operation that does not involve the driver's own manual shifting operation may cause discomfort in the driving senses of drivers who seek the pleasure of driving MT.

In view of such circumstances, the inventors of the present application have considered providing a pseudo-shifter and a pseudo-clutch pedal in EVs so that the driving sense of an MT vehicle can be obtained in EVs. Of course, these pseudo-devices are not simply attached to EVs. The inventors of the present application are considering allowing the electric motor to be controlled by the operation of the pseudo-shifter and the pseudo-clutch pedal so that torque characteristic similar to the torque characteristic of the MT vehicle can be obtained.

However, the element for obtaining the driving sensation of MT vehicle in EV is not only the torque characteristic of the vehicle. In other words, the clutch pedal of the MT vehicle mechanically operates a clutch device that engages and disengages the power, and thus a unique feeling of operation inevitably occurs. If such a unique operating feeling cannot be obtained by the pseudo-clutch pedal, the driver seeking the driving feeling of the MT vehicle may feel discomfort.

The present disclosure has been made in view of the above-described problems, and an object thereof is to provide an electric vehicle capable of obtaining a driving feeling as if a driver is operating a clutch pedal of an MT vehicle.

In order to solve the above problems, the first disclosure is applied to an electric vehicle using an electric motor as a power source for traveling. The electric vehicle includes an accelerator pedal, a pseudo-clutch pedal, a pseudo-shifter, and a controller configured to control motor torque output by the electric motor. The controller includes a memory and a processor. The memory is configured to store an MT vehicle model simulating a torque characteristic of a driving wheel torque in an MT vehicle having an internal combustion engine which is controlled torque by operation of a gas pedal, and a manual transmission in which a gear stage is switched by operation of a clutch pedal and a shifter. The processor is configured to execute a process of receiving an operation amount of the accelerator pedal as an input of an operation amount of the gas pedal with respect to the MT vehicle model, a process of receiving an operation amount of the pseudo-clutch pedal as an input of an operation amount of the clutch pedal with respect to the MT vehicle model, a process of receiving a shift position of the pseudo-shifter as an input of a shift position of the shifter with respect to the MT vehicle model, a process of calculating the driving wheel torque determined by the operation amount of the accelerator pedal, the operation amount of the pseudo-clutch pedal, and the shift position of the pseudo-shifter, using the MT vehicle model, and a process of calculating the motor torque for providing the driving wheel torque to driving wheels of the electric vehicle. The electric vehicle includes a pedal reaction force generator that generates a pedal reaction force against operation of the pseudo-clutch pedal, by operation of a reaction force actuator. Then, the controller is configured to control the pedal reaction force output by the pedal reaction force generator in response to the operation amount of the pseudo-clutch pedal.

The second disclosure has the following features in the first disclosure.

The memory is configured to store a pedal reaction force characteristic simulating a characteristic of the pedal reaction force corresponding to the operation of the clutch pedal. Then, the processor is configured to execute a process of controlling the pedal reaction force output by the pedal reaction force generator using the pedal reaction force characteristic.

The third disclosure has the following features in the second disclosure.

The memory is configured to store a plurality of pedal reaction force characteristics of different characteristics. The electric vehicle includes a pattern selection switch for selecting one pedal reaction characteristic from among the plurality of pedal reaction force characteristics. Then, the processor is configured to execute a process of controlling the pedal reaction force output by the pedal reaction force generator using the pedal reaction force characteristic selected by the pattern selection switch.

The fourth disclosure has the following features in the second disclosure.

The pedal reaction characteristic includes a first pedal reaction force characteristic simulating the pedal reaction characteristic at a time of depressing operation of the clutch pedal, and a second pedal reaction force characteristic simulating the pedal reaction characteristic at a time of return operation of the clutch pedal, and the second pedal reaction force characteristic is different from the first pedal reaction force characteristic. Then, the processor is configured to execute a process of determining whether an operation of the pseudo-clutch pedal is a depressing operation or a return operation based on a change in the operation amount of the pseudo-clutch pedal, and a process of calculating the pedal reaction force corresponding to the operation amount of the pseudo-clutch pedal using the first pedal reaction force characteristic, when the operation of the pseudo-clutch pedal is the depressing operation, and of calculating the pedal reaction force corresponding to the operation amount of the pseudo-clutch pedal using the second pedal reaction force characteristic, when the operation of the pseudo clutch pedal is the return operation.

The fifth disclosure has the following features in the fourth disclosure.

The processor is configured to execute a process of vibrating the pedal reaction force during a period in which the operation amount of the pseudo-clutch pedal belongs to a predetermined half-engagement region corresponding to a half-engagement state of the clutch pedal when the operation of the pseudo-clutch pedal is the return operation.

According to the above configuration, the driver can drive the electric vehicle like an MT vehicle having an internal combustion engine and a manual transmission. Further, the electric vehicle is provided with a pedal reaction force generator that generates a pedal reaction force in response to the operation of the pseudo-clutch pedal. The pedal reaction force output by the pedal reaction force generator is controlled in response to the operation of the driver's pseudo-clutch pedal. This makes it possible for the driver to obtain a driving feeling as if the driver is operating the clutch pedal of the MT vehicle.

Further, according to the second disclosure, the memory stores the pedal reaction force characteristic simulating the characteristic of the pedal reaction force corresponding to the operation of the clutch pedal. Therefore, by controlling the pedal reaction force output by the pedal reaction force generator using the pedal reaction force characteristic, the pedal reaction force characteristic of the pseudo-clutch pedal can be made close to the pedal reaction force characteristic of the clutch pedal of the MT vehicle.

According to the third disclosure, it is possible for the driver to select a desired pedal reaction force characteristic among a plurality of pedal reaction force characteristics. This makes it possible to reflect the driver's preference in the feeling of operation of the pseudo-clutch pedal.

According to the fourth disclosure, the first pedal reaction force characteristic simulating the pedal reaction force characteristic during the depressing operation of the clutch pedal and the second pedal reaction force characteristic simulating the pedal reaction force characteristic during the return operation of the clutch pedal can be selectively used in response to the operation of the pseudo-clutch pedal. Thus, the operation feeling of the depressing operation and the return operation of the pseudo-clutch pedal can be brought close to the operation feeling of the clutch pedal of the MT vehicle.

According to a fifth disclosure, during the return operation of the clutch pedal, vibration in a semi-engaged state is simulated. This makes it possible for the driver to obtain a driving feeling as if the driver is operating the clutch pedal of the MT vehicle.

DETAILED DESCRIPTION

Figure 1:
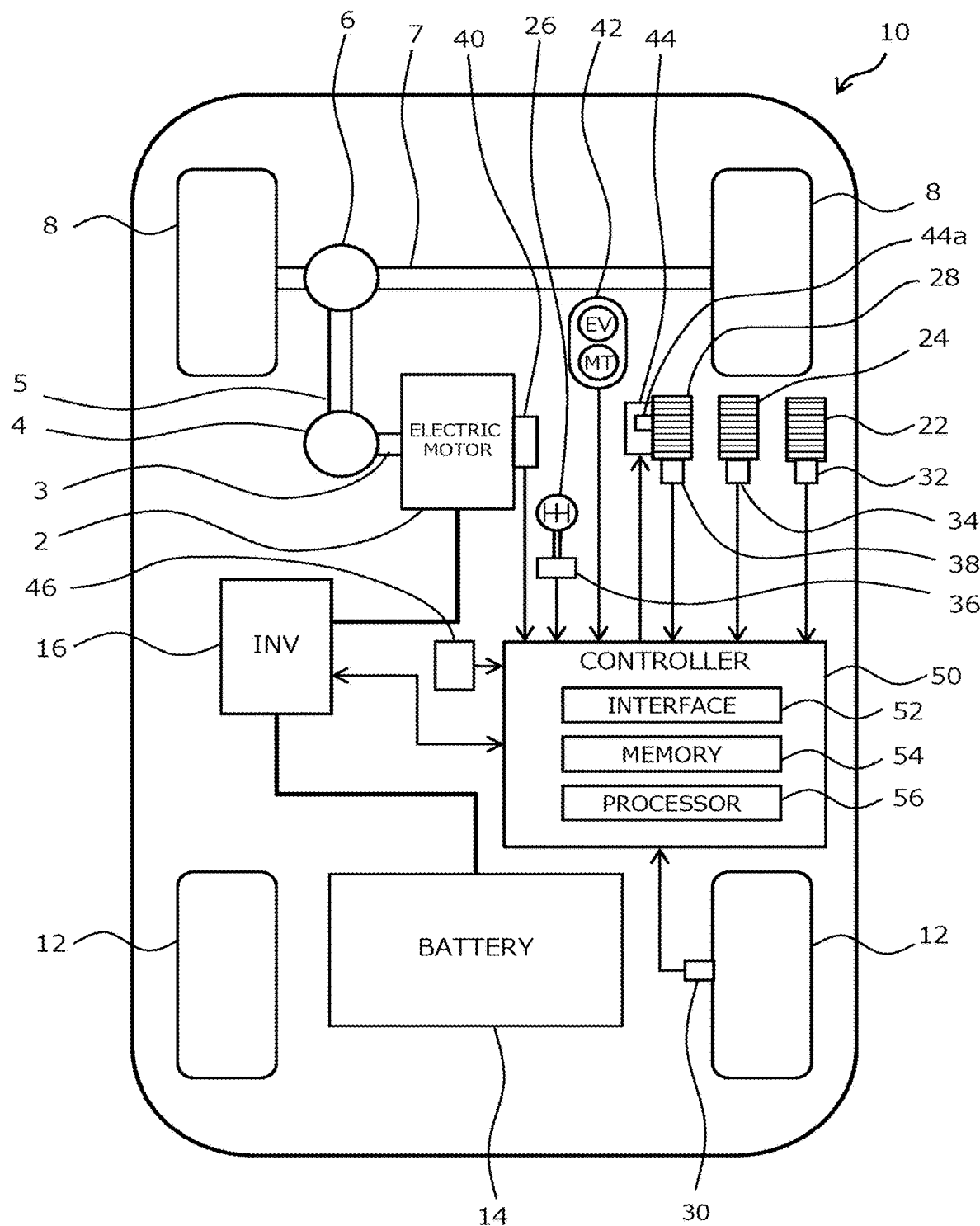
FIG. 1 is a diagram schematically illustrating a configuration of a power system of an electric vehicle according to a present embodiment.

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures or the like theoretically. In the drawings, the same or corresponding parts of are denoted by the same reference numerals, and duplicate descriptions thereof are appropriately simplified or omitted.

1. First Embodiment 1-1. Configuration of Electric Vehicle

FIG. 1 is a diagram schematically illustrating a configuration of a power system of an electric vehicle 10 according to the present embodiment. As shown in FIG. 1, the electric vehicle 10 includes an electric motor 2 as a power source. The electric motor 2 is, for example, a brushless DC motor or a three-phase AC synchronous motor. The electric motor 2 is provided with a rotation speed sensor 40 for detecting its rotation speed. An output shaft 3 of the electric motor 2 is connected to one end of a propeller shaft 5 via a gear mechanism 4. The other end of the propeller shaft 5 is connected to a drive shaft 7 in front of the vehicle via a differential gear 6.

The electric vehicle 10 includes drive wheels 8, which are front wheels, and driven wheels 12, which are rear wheels. Each drive wheel 8 is provided on both ends of the drive shaft 7. Each wheel 8 and 12 is provided with a wheel speed sensor 30. In FIG. 1, only the wheel speed sensor 30 of the right-rear wheel is represented. The wheel speed sensor 30 is also used as a vehicle speed sensor for detecting the vehicle speed of the electric vehicle 10. The wheel speed sensor 30 is connected to a controller 50 to be described later by an in-vehicle network such as a CAN (Controller Area Network).

The electric vehicle 10 includes a battery 14 and an inverter 16. The battery 14 stores electrical energy that drives the electric motor 2. The inverter 16 converts DC power input from the battery 14 into driving power for the electric motor 2. Power conversion by the inverter 16 is performed by PWM (Pulse Wave Modulation) control by the controller 50. The inverter 16 is connected to the controller 50 by the in-vehicle network.

The electric vehicle 10 includes an accelerator pedal 22 for inputting an acceleration request and a brake pedal 24 for inputting a braking request as an operation request input devices for inputting an operation requests to the electric vehicle 10 by the driver. The accelerator pedal 22 is provided with an accelerator position sensor 32 for detecting an accelerator opening degree Pap [%] which is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the controller 50 by the in-vehicle network.

The electric vehicle 10 further includes a pseudo-shift lever (pseudo-shifter) 26 and a pseudo-clutch pedal 28 as operation input devices. A shift lever (shifter) and a clutch pedal are devices that operate a manual transmission (MT), but, of course, the electric vehicle 10 is not equipped with the MT. The pseudo-shift lever 26 and the pseudo-clutch pedal 28 are dummies that differ from the original shift lever or clutch pedal.

The pseudo-shift lever 26 has a structure that simulates a shift lever provided by a MT vehicle. The arrangement and operating feeling of the pseudo-shift lever 26 is equivalent to the actual MT vehicle. The pseudo-shift lever 26 has positions that correspond to each gear stage, for example, 1st gear stage, 2nd gear stage, 3rd gear stage, 4th gear stage, 5th gear stage, 6th gear stage, and neutral stage. The pseudo-shift lever 26 is provided with a shift position sensor 36 for detecting gear stage by determining which position the pseudo-shift lever 26 is in. The shift position sensor 36 is connected to the controller 50 by the in-vehicle network.

The pseudo-clutch pedal 28 has a structure that simulates a clutch pedal provided in the MT vehicle. The arrangement of the pseudo-clutch pedals 28 is equivalent to that of the actual MT vehicle. The driver depresses the pseudo-clutch pedal 28 when it is desired to change the setting of the gear stage by the pseudo-shift lever 26, and when the setting change of the gear stage is completed, the driver stops depressing and returns the pseudo-clutch pedal 28 to its original state. The pseudo-clutch pedal 28 is provided with a clutch position sensor 38 for detecting depression amount Pc [%] which is an operation amount of the pseudo-clutch pedal 28. The clutch position sensor 38 is connected to the controller 50 by the in-vehicle network.

The electric vehicle 10 is equipped with a pedal reaction force generator 44 to make the operation feeling of the pseudo-clutch pedal 28 closer to the operation feeling of the clutch pedal of the MT vehicle. The pedal reaction force generator 44 is a device that generates a pedal reaction force in a direction in which the pseudo-clutch pedal 28 is returned in response to an operation of the pseudo-clutch pedal 28. The pseudo-clutch pedal 28 includes a reaction force actuator 44a for generating a pedal reaction force. The reaction force actuator 44a is, for example, an electric motor. The structure of the pedal reaction force generator 44 is not limited. The pseudo-clutch pedal 28 is connected to the controller 50 by the in-vehicle network.

The electric vehicle 10 is equipped with a pattern selection switch 46. The pattern selection switch 46 is a switch for selecting a pedal reaction characteristic of the pseudo-clutch pedal 28 of the electric vehicle 10. Although details will be described later, a plurality of different pedal reaction characteristics are stored in the electric vehicle 10. The pattern selection switch 46 is configured to be able to select an arbitrary pedal reaction characteristic from among the plurality of pedal reaction characteristics. The pattern selection switch 46 is, for example, a switch displayed on an HMI (Human Machine Interface) unit installed in the vicinity of the instrument panel. The pattern selection switch 46 is connected to the controller 50 by the in-vehicle network.

The electric vehicle 10 is equipped with a mode selection switch 42. The mode selection switch 42 is a switch for selecting a traveling mode of the electric vehicle 10. The traveling mode of the electric vehicle 10 includes an MT mode and an EV mode. The mode selection switch 42 is configured to be able to arbitrarily select either the MT mode or the EV mode. Although details will be described later, in the MT mode, the electric motor 2 is controlled in the control mode for driving the electric vehicle 10 like the MT vehicle (first mode). In the EV mode, the electric motor 2 is controlled in the normal control mode for the common electric vehicle (second mode). The mode selection switch 42 is connected to the controller 50 by the in-vehicle network.

The controller 50 is typically an ECU (Electronic Control Unit) mounted on the electric vehicle 10. The controller 50 may be a combination of a plurality of ECUs. The controller 50 includes an interface 52, a memory 54, and a processor 56. The in-vehicle network is connected to the interface 52. The memory 54 includes a RAM (Random Access Memory) for temporarily recording data and a ROM (Read Only Memory) for storing a control program executable by the processor 56 and various data related to the control program. The processor 56 reads out and executes the control program and data from the memory 54, and generates a control signal based on a signal acquired from each sensor.

Figure 2:
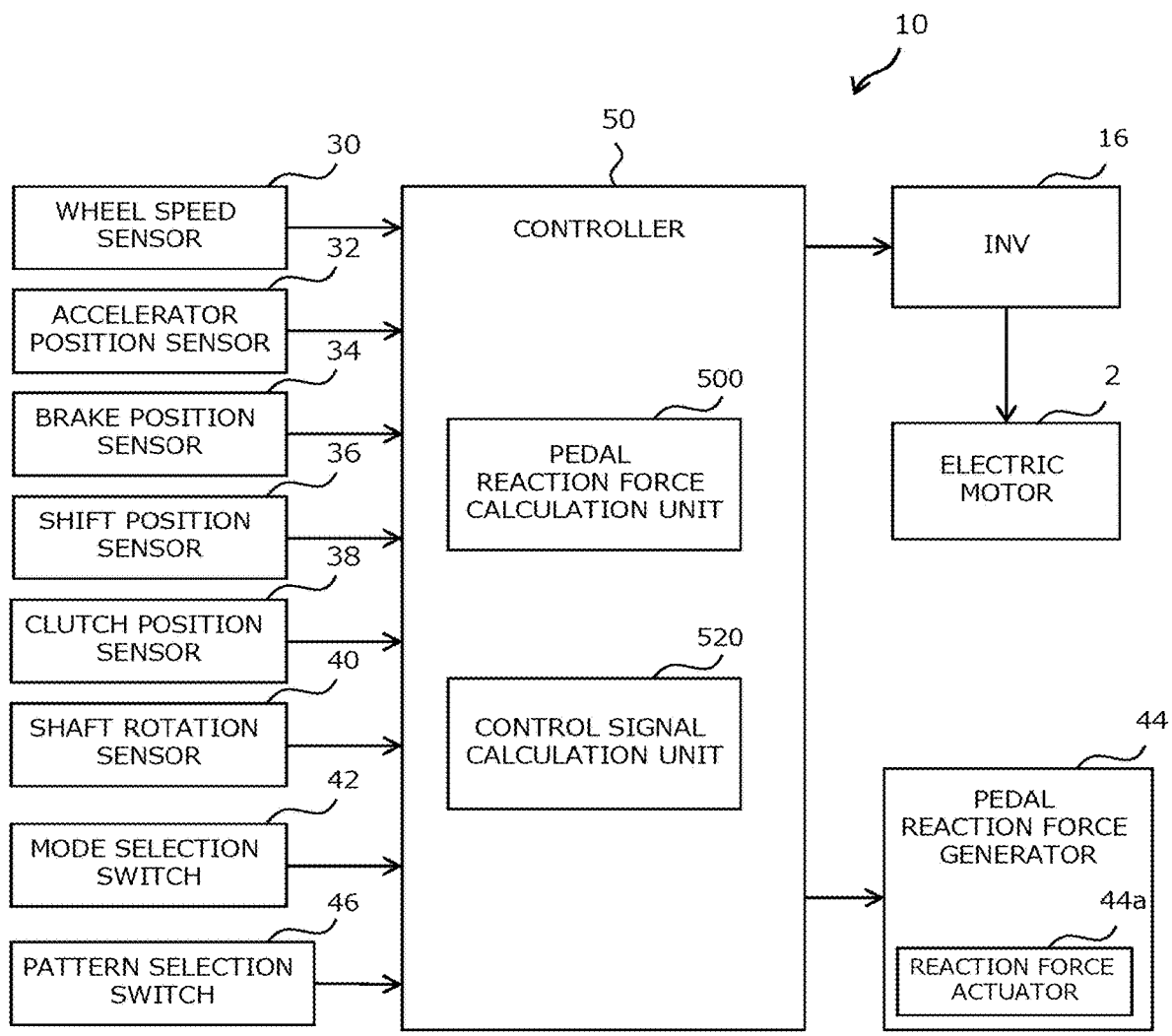
FIG. 2 is a block diagram illustrating a configuration of a control system of the electric vehicle shown in FIG. 1.

FIG. 2 is a block diagram illustrating a configuration of a control system of the electric vehicle 10 according to the present embodiment. The controller 50 receives signals at least from the wheel speed sensor 30, the accelerator position sensor 32, the brake position sensor 34, the shift position sensor 36, the clutch position sensor 38, the rotation speed sensor 40, the mode selection switch 42 and the pattern selection switch 46. The in-vehicle network is used for communication between these sensors and the controller 50. Although not shown, in addition to these sensors, various other sensors are mounted on the electric vehicle 10, and connected to the controller 50 by the in-vehicle network.

Further, a signal is output from the controller 50 to at least the inverter 16 and the pedal reaction force generator 44. The in-vehicle network is used for communication between these devices and the controller 50. Although not shown, in addition to these devices, various other actuators and indicators are mounted on the electric vehicle 10, and connected to the controller 50 by the in-vehicle network.

The controller 50 has a function as a pedal reaction force calculation unit 500 and a function as a control signal calculation unit 520. More specifically, when the processor 56 executes a program stored in the memory 54, the processor 56 functions as at least the pedal reaction force calculation unit 500 and the control signal calculation unit 520. The control signal calculation is a function to calculate a control signal for an actuator or a device. The control signal includes at least a signal for PWM control of the inverter 16. These functions of the controller 50 will be described below.

1-2. Functions of Controller 1-2-1. Motor torque Calculation Function

Figure 3:
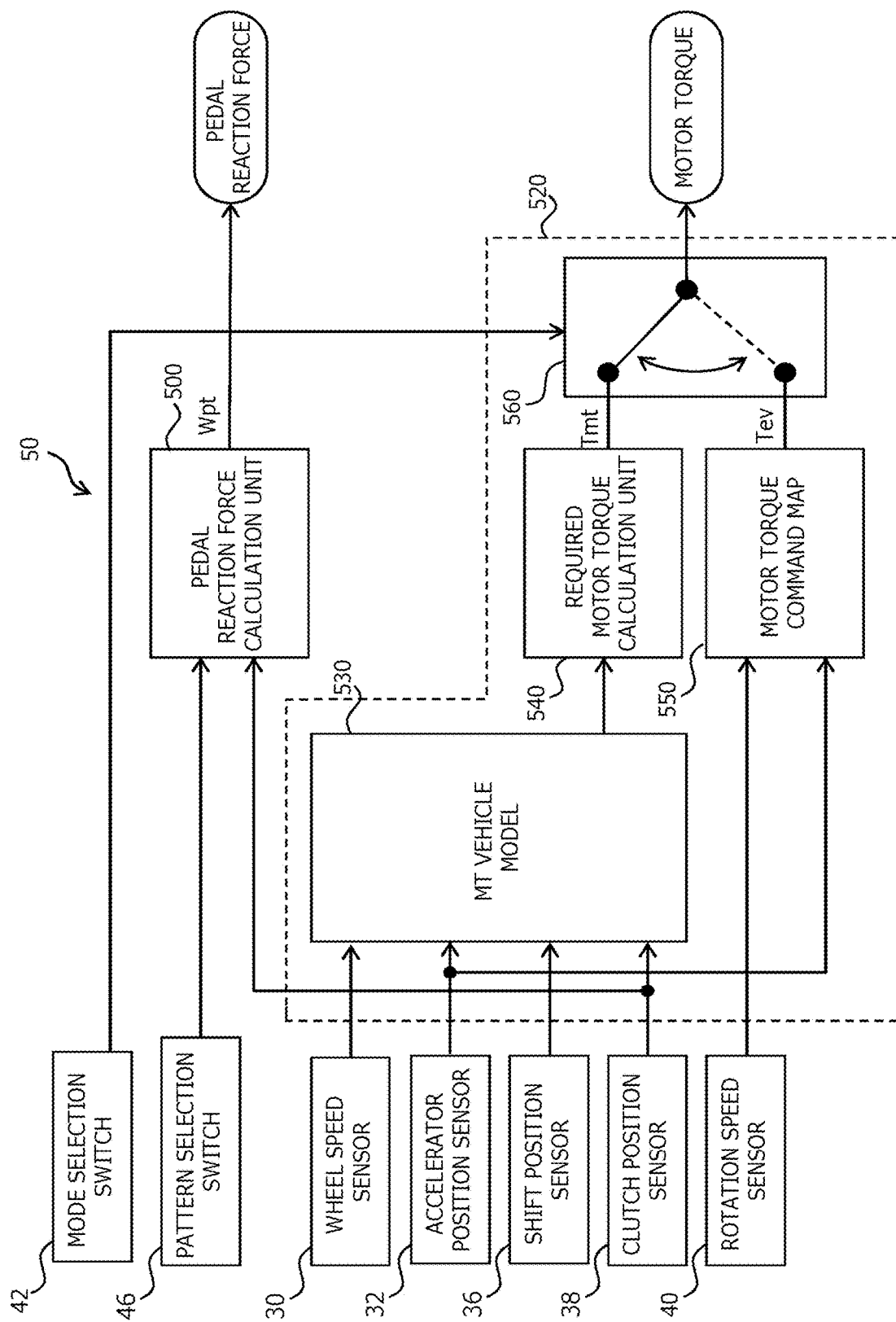
FIG. 3 is a block diagram showing a function of a controller of the electric vehicle shown in FIG. 1.

FIG. 3 is a block diagram illustrating functions of the controller 50 according to the present embodiment, in particular, a function relating to a calculation of the motor torque command value for the electric motor 2. The controller 50 calculates the motor torque command value by the function shown in this block diagram, and generates the control signal for the PWM control of the inverter 16 based on the motor torque command value.

As shown in FIG. 3, the control signal calculation unit 520 includes an MT vehicle model 530, a required motor torque calculation unit 540, a motor torque command map 550, and a changeover switch 560. The control signal calculation unit 520 receives signals from the wheel speed sensor 30, the accelerator position sensor 32, the shift position sensor 36, the clutch position sensor 38, the rotation speed sensor 40, and the mode selection switch 42. The control signal calculation unit 520 processes the signals from these sensors and calculates motor torque which the electric motor 2 is made to output.

The calculation of the motor torque by the control signal calculation unit 520 includes two calculations using the MT vehicle model 530 and the required motor torque calculation unit 540, and the calculation using the motor torque command map 550. The former is used to calculate the motor torque when the electric vehicle 10 is to travel in the MT mode. The latter is used to calculate the motor torque when the electric vehicle 10 is to travel in the EV mode. Which motor torque is used is determined by the changeover switch 560. The changeover switch 560 operates by a signal input from the mode selection switch 42.

1-2-2. Calculation of Motor Torque in MT Mode

The driving wheel torque in the MT vehicle is determined by the operation of a gas pedal that controls fuel supply to the engine, the operation of a shift lever (shifter) that switches the gear stage of the MT, and the operation of a clutch pedal that operates a clutch between the engine and the MT. The MT vehicle model 530 is a model that calculates the driving wheel torque obtained by the operation of the accelerator pedal 22, the pseudo-clutch pedal 28, and the pseudo-shift lever 26 assuming that the electric vehicle 10 is equipped with the engine, the clutch, and the MT. Hereinafter, in the MT mode, the engine, the clutch, and the MT virtually realized by the MT vehicle model 530 are referred to as a virtual engine, a virtual clutch, and a virtual MT.

The MT vehicle model 530 receives a signal of the accelerator position sensor 32 as an operation amount of the gas pedal of the virtual engine. A signal of the shift position sensor 36 is input to the MT vehicle model 530 as a shift position of the shifter of the virtual MT. Further, a signal of the clutch position sensor 38 is input to the MT vehicle model 530 as an operation amount of the clutch pedal of the virtual clutch. The signal of the wheel speed sensor 30 is also input to the MT vehicle model 530 as a signal indicating the load condition of the vehicle. The MT vehicle model 530 is a model simulating the torque characteristic of the driving wheel torque in the MT vehicle. The MT vehicle model 530 is configured so that the operation of the accelerator pedal 22, the pseudo-shift lever 26, and the pseudo-clutch pedal 28 by the driver is reflected in the value of the driving wheel torque. Details of the MT vehicle model 530 will be described later.

The required motor torque calculation unit 540 converts the driving wheel torque calculated by the MT vehicle model 530 to a required motor torque. The required motor torque is the motor torque required for realizing the driving wheel torque calculated by the MT vehicle model 530. The reduction ratio from the output shaft 3 of the electric motor 2 to the driving wheels 8 is used to convert the driving wheel torque into the required motor torque.

1-2-3. Calculation of Motor Torque in EV Mode

Figure 4:
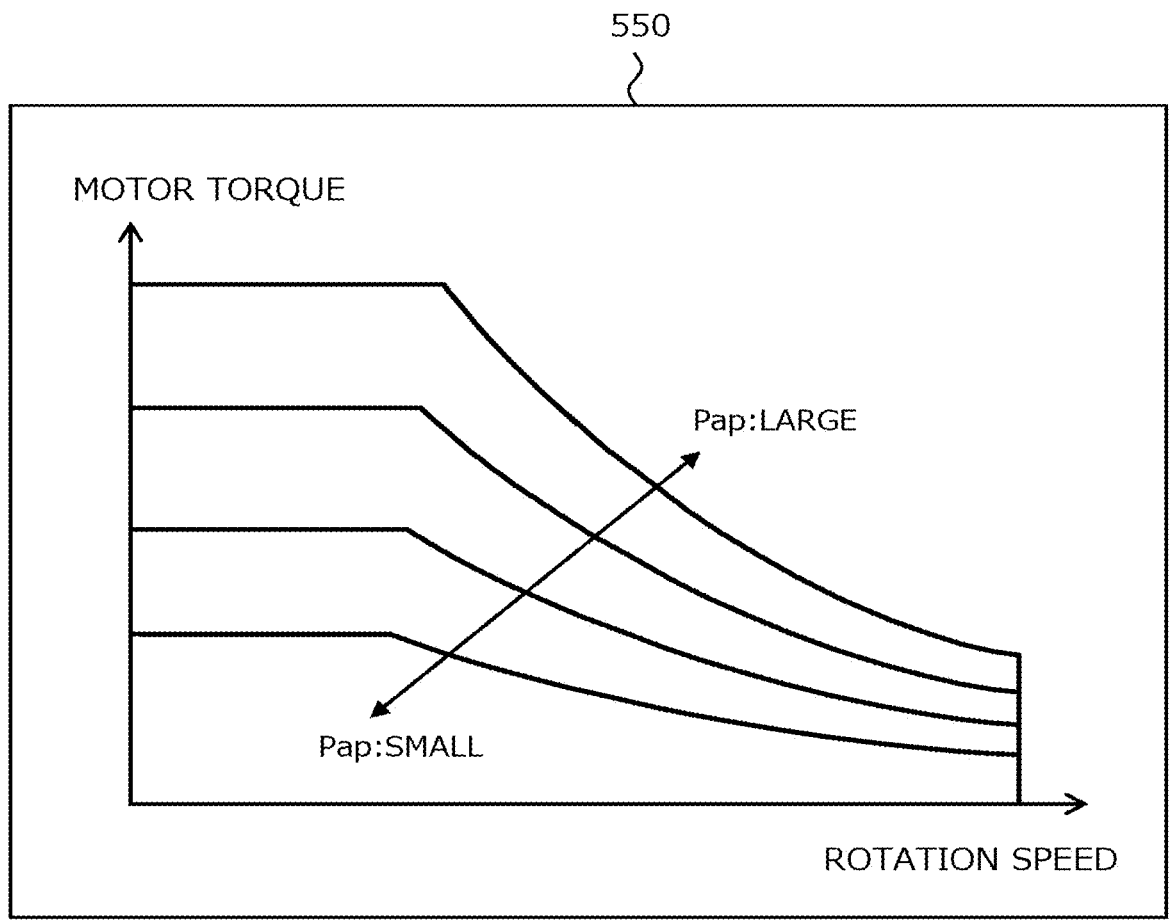
FIG. 4 is a diagram showing an example of a motor torque command map included in the controller shown in FIG. 3.

FIG. 4 is a diagram illustrating an example of the motor torque command map 550 used for calculating the motor torque in the EV mode. The motor torque command map 550 is a map to determine the motor torque using the accelerator opening Pap and the rotation speed of the electric motor 2 as parameters. A signal of the accelerator position sensor 32 and a signal of the rotation speed sensor 40 are input to the respective parameters of the motor torque command map 550. The motor torque corresponding to these signals is output from the motor torque command map 550.

1-2-4. Switching of Motor Torque

The motor torque calculated using the motor torque command map 550 is denoted as Tev, and the motor torque calculated using the MT vehicle model 530 and the required motor torque calculation unit 540 is denoted as Tmt. The motor torque selected by the changeover switch 560 among the two motor torques Tev and Tmt is given as the motor torque command value for the electric motor 2.

In the EV mode, the operation is not reflected in the operation of the electric vehicle 10 even if the driver operates the pseudo-shift lever 26 or the pseudo-clutch pedal 28. That is, in the EV mode, the operation of the pseudo-shift lever 26 and the operation of the pseudo-clutch pedal 28 are disabled. However, even while the motor torque Tev is output as the motor torque command value, the calculation of the motor torque Tmt using the MT vehicle model 530 is continued. Conversely, the calculation of the motor torque Tev is continued even while the motor torque Tmt is output as the motor torque command value. That is, both the motor torque Tev and the motor torque Tmt are continuously input to the changeover switch 560.

By switching the input by the changeover switch 560, the motor torque command value is switched from the motor torque Tev to the motor torque Tmt, or from the motor torque Tmt to the motor torque Tev. At this time, when there is a deviation between the two motor torques, a torque level difference is generated with switching. Therefore, for a while after switching, so as not to cause a sudden change in torque, the gradual change process is performed on the motor torque command value. For example, in the switching from the EV mode to the MT mode, the motor torque command value is not immediately switched from the motor torque Tev to the motor torque Tmt, it is changed toward the motor torque Tmt at a predetermined rate of change. The same process is performed in switching from the MT mode to the EV mode.

The changeover switch 560 operates in accordance with the traveling mode selected by the mode selection switch 42. When the EV mode is selected by the mode selection switch 42, the changeover switch 560 connects to the motor torque command map 550 and outputs the motor torque Tev input from the motor torque command map 550 as a motor torque command value. When the MT mode is selected by the mode selection switch 42, the changeover switch 560 switches the connection destination to the required motor torque calculation unit 540. Then, the changeover switch 560 outputs the motor torque Tmt input from the required motor torque calculation unit 540 as the motor torque command value. Such switching of the input is performed in conjunction with the selection of the traveling mode by the mode selection switch 42.

1-2-5. MT Vehicle Model 1-2-5-1. Overview

Figure 5:
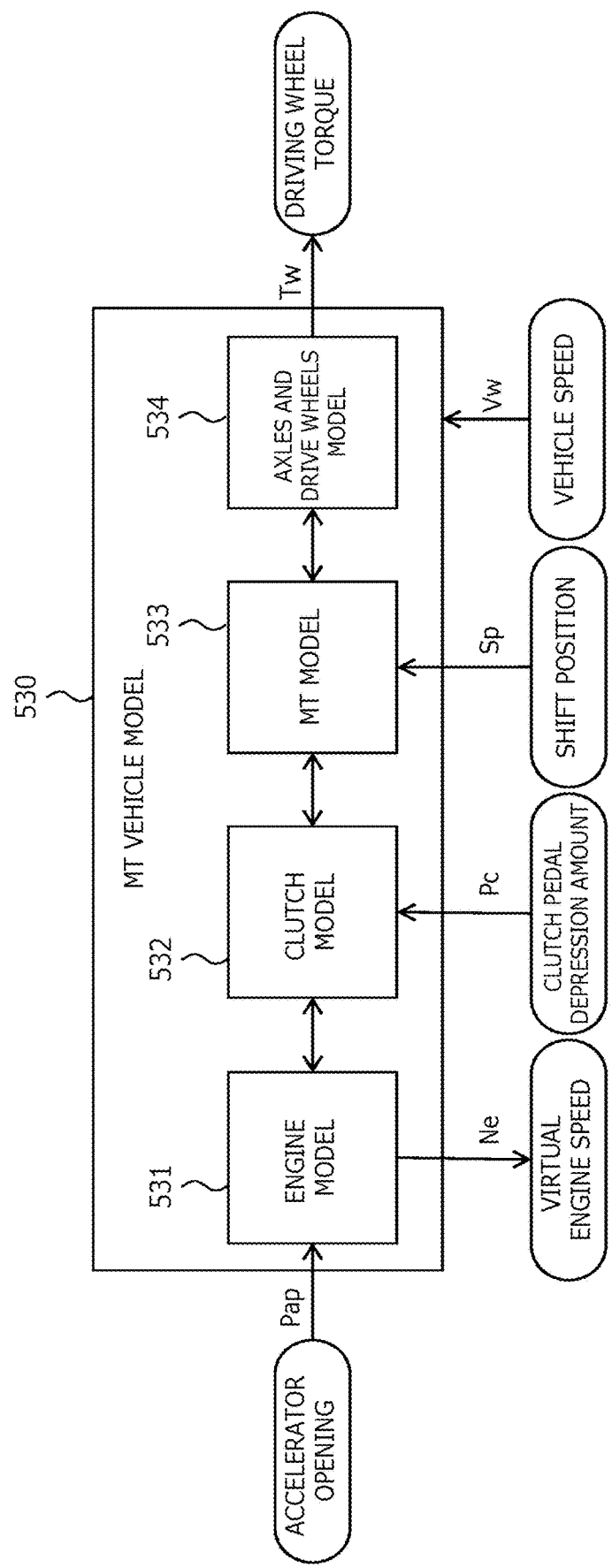
FIG. 5 is a block diagram showing an example of an MT vehicle model included in the controller shown in FIG. 3.

Next, the MT vehicle model 530 will be described. FIG. 5 is a block diagram illustrating an example of the MT vehicle model 530. The MT vehicle model 530 includes an engine model 531, a clutch model 532, an MT model 533, and an axles and drive wheels model 534. In the engine model 531, the virtual engine is modeled. In the clutch model 532, the virtual clutch is modeled. In the MT model 533, the virtual MT is modeled. In the axles and drive wheels model 534, the virtual torque transmission system from the axles to the drive wheels is modeled. Each model may be represented by a calculation formula or may be represented by a map.

Calculation results are input and output between the models. Further, the accelerator opening degree Pap detected by the accelerator position sensor 32 is input to the engine model 531. The clutch pedal depressing amount Pc detected by the clutch position sensor 38 is input to the clutch model 532. The shift position Sp detected by the shift position sensor 36 is input to the MT model 533. In addition, in the MT vehicle model 530, the vehicle speed Vw (or wheel speed) detected by the wheel speed sensor 30 is used in a plurality of models. In the MT vehicle model 530, a driving wheel torque Tw and a virtual engine speed Ne is calculated based on these input signals.

1-2-5-2. Engine Model

The engine model 531 calculates the virtual engine speed Ne and the virtual engine output torque Teout. The engine model 531 includes a model to calculate the virtual engine speed Ne and a model to calculate the virtual engine output torque Teout. For the calculation of the virtual engine speed Ne, for example, a model represented by the following equation (1) is used. In the following equation (1), the virtual engine speed Ne is calculated from a rotational speed "Nw" of the wheel 8, a total reduction ratio "R", and a slip ratio "slip" of the virtual clutch.

$$Ne = Nw \times R \times \frac{1}{1 - slip} \quad (1)$$

In the equation (1), the rotation speed Nw of the wheel 8 is detected by the wheel speed sensor 30. The total reduction ratio R is calculated from the gear ratio (transmission ratio) r calculated by the MT model 533 to be described later and the reduction ratio specified by the axles and drive wheels model 534. The slip ratio "slip" is calculated by the clutch model 532 to be described later.

Equation (1) is a calculation equation of the virtual engine speed Ne in a condition where the virtual engine and the virtual MT are engaged by the virtual clutch. When the virtual clutch is disengaged, the virtual engine torque Te generated in the virtual engine can be regarded as being used to increase the virtual engine speed Ne. The virtual engine torque Te is the torque obtained by adding a torque due to the moment of inertia to the virtual engine output torque Teout. When the virtual clutch is disengaged, the virtual engine power torque Teout is zero. Therefore, when the virtual clutch is disengaged, the engine model 531 calculates the virtual engine speed Ne by the following equation (2) using the virtual engine torque Te and the moment of inertia "J" of the virtual engine. For the calculation of the virtual engine torque Te, a map with accelerator opening Pap as a parameter is used.

$$J \times \frac{30}{\pi} \times \frac{d}{dt} Ne = Te \quad (2)$$

Incidentally, during idling of the MT vehicle, idle speed control (ISC control) is executed to maintain the engine speed at a constant rotational speed. Therefore, the engine model 531 calculates the virtual engine speed Ne as a predetermined idling speed (for example, 1000 rpm), when the virtual clutch is disengaged, the vehicle speed is 0, and the accelerator opening Pap is 0%. When the driver depresses the accelerator pedal 22 to perform revving or blipping while the vehicle is stopped, the idling speed is used as the initial value of the virtual engine speed Ne calculated by equation (2).

Figure 6:
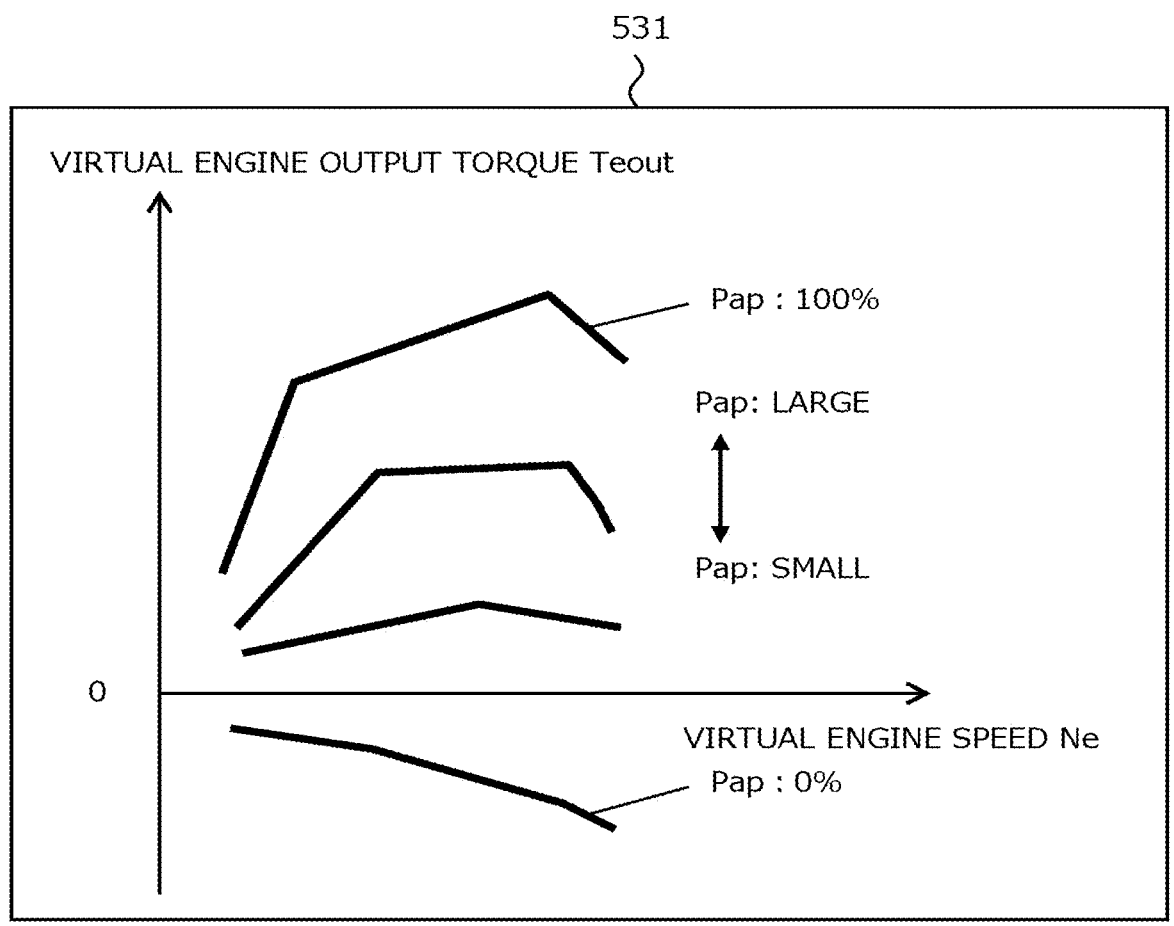
FIG. 6 is a diagram illustrating an example of an engine model constituting the MT vehicle model shown in FIG. 5.

The engine model 531 calculates the virtual engine output torque Teout from the virtual engine speed Ne and the accelerator opening Pap. For calculating the virtual engine power torque Teout, for example, a two-dimensional map as shown in FIG. 6 is used. This two-dimensional map is a map which regulates the relation between the accelerator opening Pap in steady-state, the virtual engine speed Ne, and the virtual engine output torque Teout. In this map, the virtual engine power torque Teout for the virtual engine speed Ne is given for each accelerator opening Pap. The torque characteristic shown in FIG. 6 can be set to the characteristic assumed for a gasoline engine or can be set to those assumed for a diesel engine. In addition, the torque characteristic can be set to assume a natural intake engine or a turbocharged engine. For example, an HMI unit may be installed in the vicinity of the instrument panel, and the driver may switch the virtual engine in the MT mode to a desired setting by operating the HMI unit. The virtual engine output torque Teout calculated by the engine model 531 is output to the clutch model 532.

1-2-5-3. Clutch Model

Figure 7:
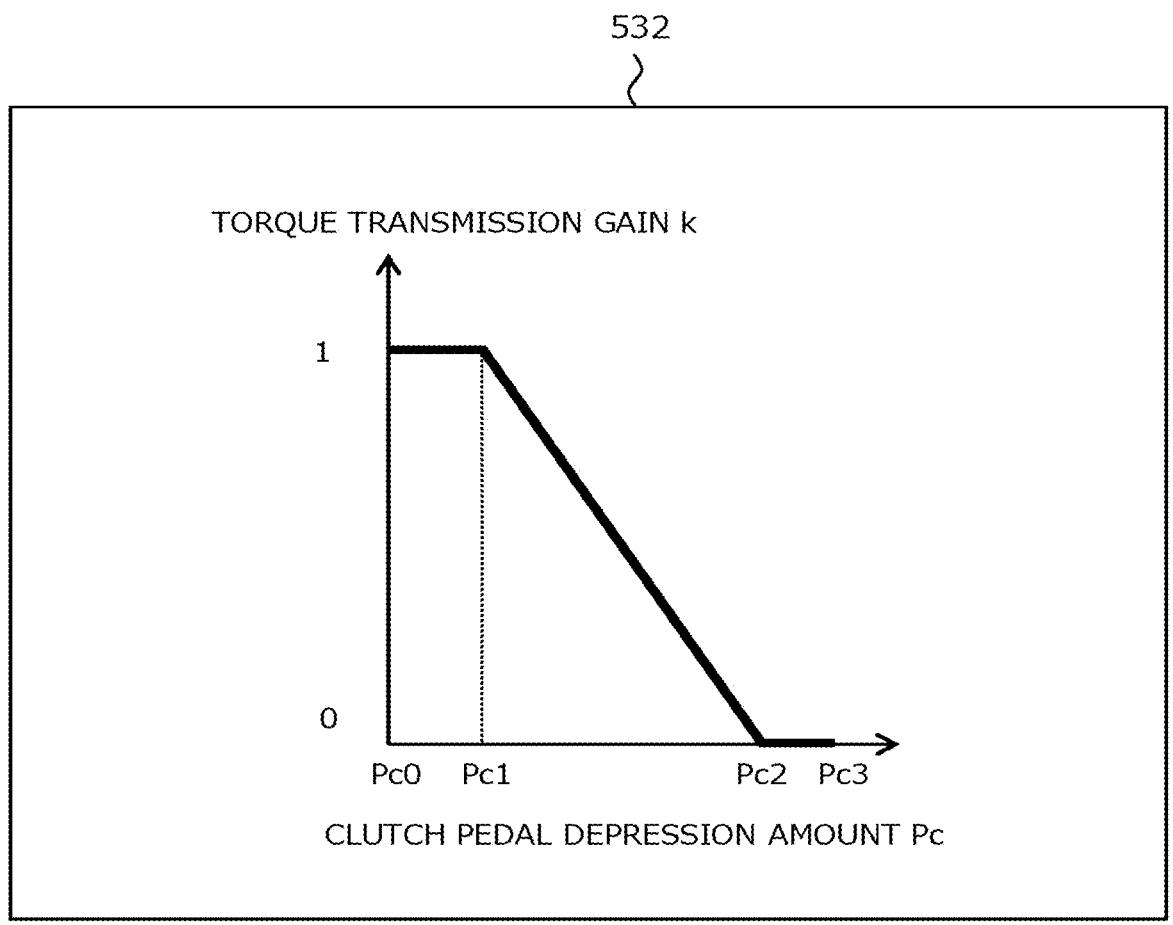
FIG. 7 is a diagram illustrating an example of a clutch model constituting the MT vehicle model shown in FIG. 5.

The clutch model 532 calculates a torque transmission gain k. The torque transmission gain k is a gain for calculating the torque transmission degree of the virtual clutch corresponding to the depression amount of the pseudo-clutch pedal 28. The clutch model 532 has, for example, a map as shown in FIG. 7. In this map, the torque transmission gain k is given for the clutch pedal depression amount Pc. In FIG. 7, the torque transmission gain k becomes 1 when that the clutch pedal depression amount Pc is in the range from Pc0 to Pc1, the clutch pedal depression amount Pc monotonically decreases at a constant slope toward zero when the clutch pedal depression amount Pc is in the range from Pc1 to Pc2, and the clutch pedal depression amount Pc becomes 0 when the clutch pedal depression amount Pc is in the range from Pc2 to Pc3. Here, Pc0 corresponds to the clutch pedal depression amount Pc of 0%, Pc1 corresponds to the play limit when the clutch pedal is depressed, Pc3 corresponds to the clutch pedal depression amount Pc of 100%, and Pc2 corresponds to the play limit when the clutch pedal is returned from Pc3.

The map shown in FIG. 7 is an example, and the change in the torque transmission gain k with respect to an increase in the clutch pedal depression amount Pc is not limited to the change curve as long as it is a broad monotonic decrease toward 0. For example, the change in torque transmission gain k in the range from Pc1 to Pc2 may be a monotonically decreasing curve that is convex upward or a monotonically decreasing curve that is convex downward.

The clutch model 532 calculates a clutch output torque Tcout using the torque transmission gain k. The clutch output torque Tcout is the torque output from the virtual clutch. The clutch model 532 calculates the clutch output torque Tcout from the virtual engine output torque Teout and the torque transmission gain k by, for example, the following equation (3). The clutch output torque Tout calculated by the clutch model 532 is output to the MT model 533.

$$Tcout = Teout \times k \quad (3)$$

1-2-5-4. MT Model

Figure 8:
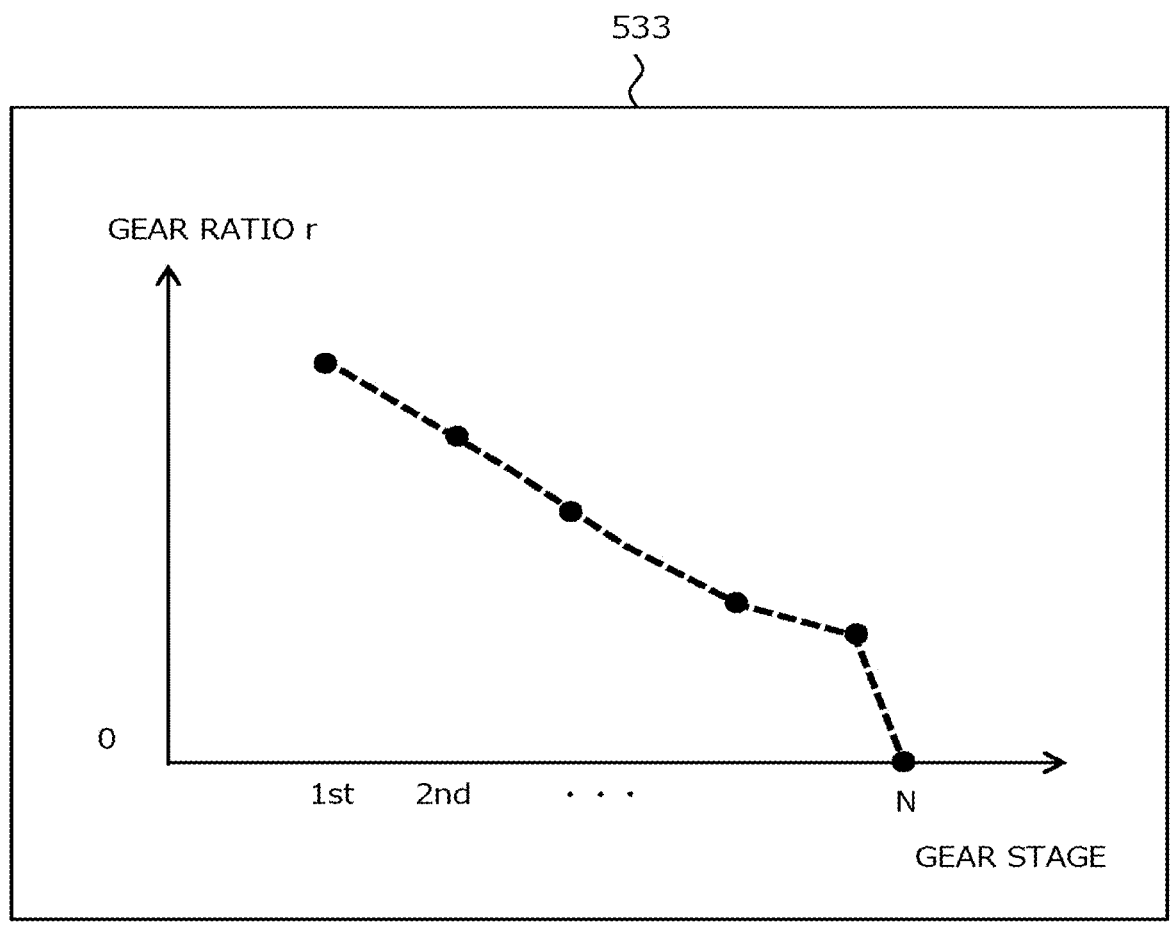
FIG. 8 is a diagram illustrating an example of an MT model constituting the MT vehicle model shown in FIG. 5.

The MT model 533 calculates the gear ratio r. The gear ratio r is a gear ratio determined by the shift position Sp of the pseudo-shift lever 26 in the virtual MT. The shift position Sp of the pseudo-shift lever 26 and the gear stage of the virtual MT is in a one-to-one relationship. The MT model 533 has, for example, a map as shown in FIG. 8. In this map, the gear ratio r is given for the gear stage. As shown in FIG. 8, the larger the gear stage, the smaller the gear ratio r.

The MT model 533 calculates a transmission output torque Tgout using the gear ratio r. The transmission output torque Tgout is the torque output from the virtual transmission. The MT model 533 calculates the transmission output torque Tgout from the clutch output torque Tcout and the gear ratio r by, for example, the following equation (4). The transmission output torque Tgout calculated by the MT model 533 is output to the axles and drive wheels model 534.

$$Tgout = Tcout \times r \quad (4)$$

1-2-5-5. Axles and Drive Wheels Model

The axles and drive wheels model 534 calculates the driving wheel torque Tw using a predetermined reduction ratio rr. The reduction ratio rr is a fixed value determined by the mechanical structure from the virtual MT to the driving wheels 8. The axles and driving wheels model 534, for example, calculates the driving wheel torque Tw from the transmission output torque Tgout and the reduction ratio rr, for example, by the following equation (5). The driving wheel torque Tw calculated by the axles and driving wheels model 534 is output to the required motor torque calculation unit 540 . . .

$$Tw = Tgout \times rr \quad (5)$$

1-2-6. Torque Characteristic of Electric Motor to be Realized in MT Mode

Figure 9:
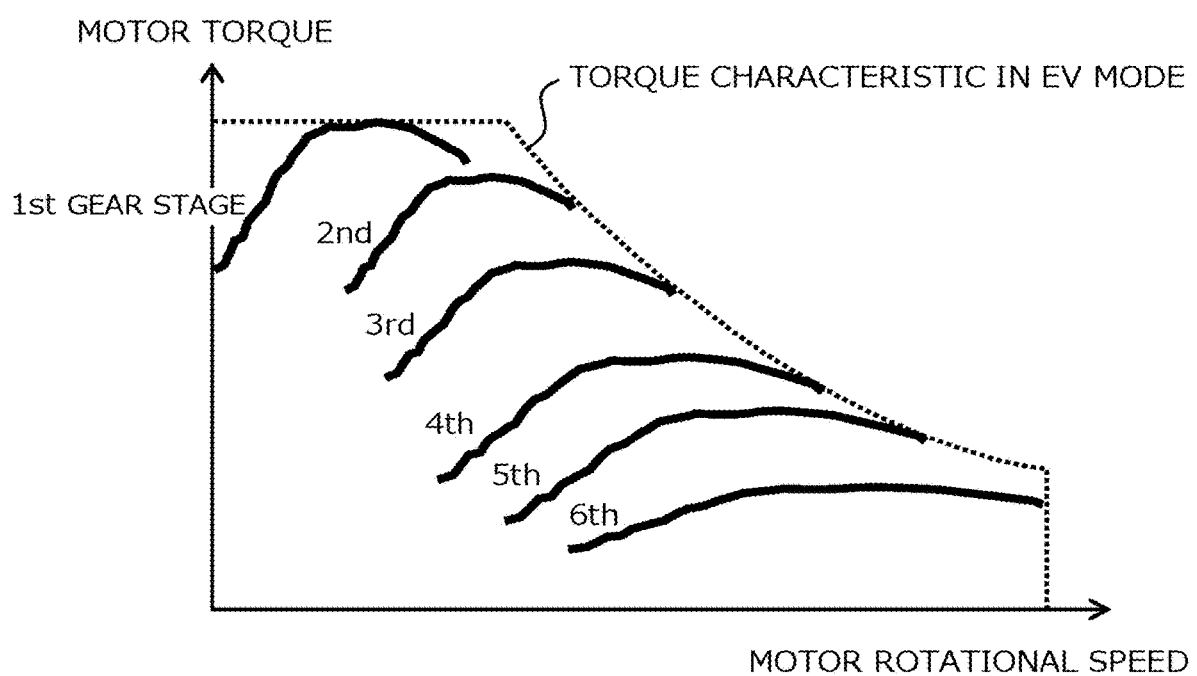
FIG. 9 is a diagram showing the torque characteristic of the electrical motor to be realized in the MT mode in comparison with the torque characteristic of the electric motor to be realized in the EV mode.

The required motor torque calculation unit 540 converts the driving wheel torque Tw calculated by the MT vehicle model 530 into motor torque. FIG. 9 is a diagram showing the torque characteristic of the electrical motor 2 to be realized in the MT mode in comparison with the torque characteristic of the electric motor 2 to be realized in the EV mode. In the case of MT mode, as shown in FIG. 9, it is possible to realize a torque characteristic (solid line in the figure) such as to simulate the torque characteristic of the MT vehicle in accordance with the gear stage set by the pseudo-shift lever 26.

1-2-7. Pedal Reaction Force Addition Control

Next, the pedal reaction force addition control by the pedal reaction force calculation unit 500 will be described. The effect of the mechanical operation of the clutch device is superimposed on the pedal reaction force of the clutch pedal in an actual MT vehicle. Therefore, the pedal reaction force of the actual MT vehicle has unique change characteristic according to a pedal depression amount. The pedal reaction force generator 44 of this embodiment is a device for producing a unique pedal reaction force of such an actual MT vehicle.

In the memory 54 of the controller 50 of the present embodiment, the pedal reaction characteristic simulating the characteristic of the pedal reaction force of the clutch pedal of an actual MT vehicle is stored in association with the pedal depression amount of the pseudo-clutch pedal 28. The controller 50 executes a process of calculating a pedal reaction force Wpt corresponding to the pedal depression amount of the pseudo-clutch pedal 28 by the driver using the stored pedal reaction force characteristic.

However, the operation feeling of the clutch pedal required by the driver is not always the same. Some drivers seek heavy clutch operations simulating the driving sensation of sports-type vehicles, etc., while others seek light clutch operations with less physical burden. Therefore, the controller 50 of the first embodiment further includes the following functions for reflecting the preference of the driver to the operation feeling of the clutch pedal.

Figure 10:
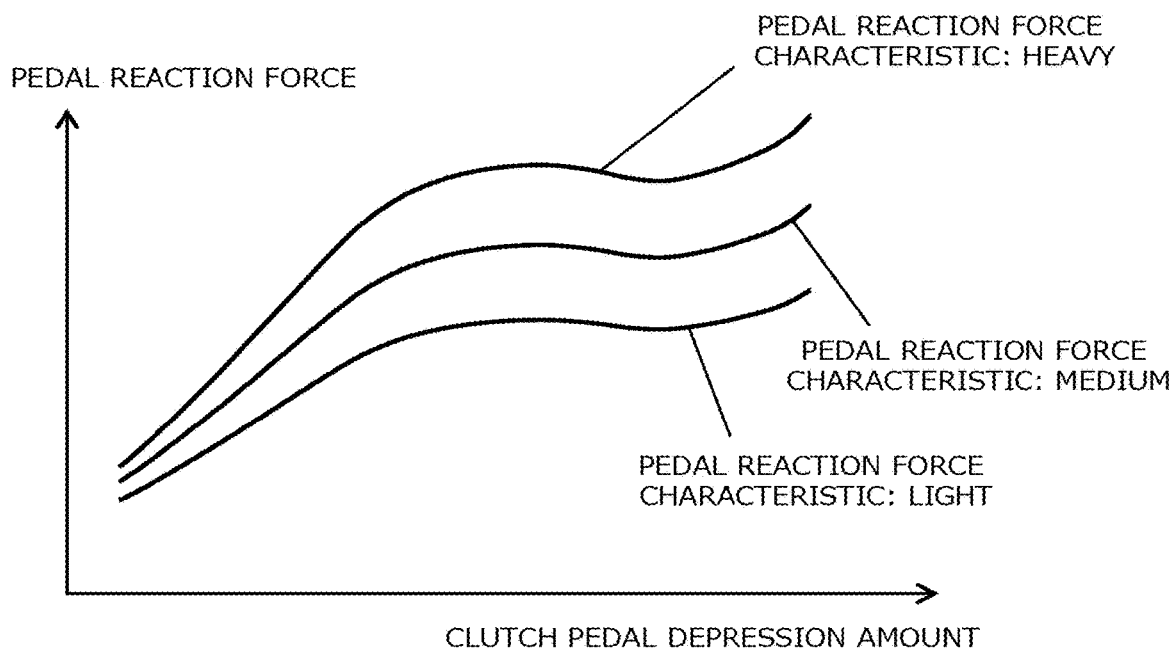
FIG. 10 is a diagram illustrating an example of a reaction force characteristic of the pseudo-clutch pedal.

A plurality of patterns of pedal reaction characteristic corresponding to the pedal depression amount of the pseudo-clutch pedal 28 are stored in the memory 54 of the controller 50 of this embodiment. FIG. 10 is a diagram illustrating an example of a reaction force characteristic of the pseudo-clutch pedal. In this drawing, three types of patterns (heavy, medium, and light) having different pedal reaction force characteristic are illustrated. The driver selects a pattern of a desired pedal reaction force characteristic from the pattern selection switch 46.

As shown in FIG. 3, a signal from the clutch position sensor 38 and the pattern selection switch 46 is input to the pedal reaction force calculation unit 500. The pedal reaction force calculation unit 500 processes signals from these sensors and calculates the pedal reaction force Wpt corresponding to the pedal operation amount using the selected pedal reaction force characteristic.

The controller 50 outputs a control signal for realizing the calculated pedal reaction force Wpt to the pedal reaction force generator 44. The pedal reaction force generator 44 operates the reaction force actuator 44a according to the input control signal. According to such a pedal reaction force addition control, the pedal reaction force of the pseudo-clutch pedal 28 that matches the preference of the driver is produced. This allows the driver to easily enjoy the sensation of operating the clutch pedal, such as MT vehicles.

1-3. Other

The electric vehicle 10 according to the above embodiment is an FF vehicle for driving the front wheels with one electric motor 2. However, the present disclosure is also applicable to electric vehicles in which two electric motors are arranged in front and rear, and each of the front and rear wheels is driven. The present disclosure is also applicable to electric vehicles with in-wheel motors on each wheel. For the MT vehicle model in these cases, a model of an all-wheel-drive vehicle with MT can be used. This modification can also be applied to the electric vehicle of another embodiment to be described later.

The electric vehicle 10 according to the above embodiment is not provided with a transmission. However, the present disclosure is also applicable to electric vehicles with stepped or continuously variable automatic transmissions. In this case, the power train consisting of the electric motor and the automatic transmission may be controlled so as to output the motor torque calculated by MT vehicle model. This modification can also be applied to the electric vehicle of another embodiment to be described later.

The electric vehicle 10 according to the above embodiment includes the pattern selection switch 46. However, the present disclosure is also applicable to electric vehicles without the pattern selection switch 46. In this case, a single pedal reaction force characteristic stored in the memory 54 may be used at all times. This modification can also be applied to the electric vehicle of another embodiment to be described later.

The electric vehicle 10 according to the above embodiment, a plurality of types of pedal reaction characteristics are stored in advance in the memory 54. However, the pedal reaction force characteristic may be configured to be arbitrarily settable by the driver. In this case, for example, it may be configured so that the pedal reaction force characteristic can be set to a desired characteristic by the operation of an HMI unit. This modification can also be applied to the electric vehicle of another embodiment to be described later.

2. Second Embodiment 2-1. Configuration of Electric Vehicle According to Second Embodiment The configuration of the electric vehicle according to the second embodiment is the same as the electric vehicle 10 of the first embodiment shown in FIG. 1. Therefore, a detailed description of the electric vehicle 10 of the second embodiment is omitted.

2-2. Features of Electric Vehicle According to Second Embodiment

The pedal reaction force characteristic of the clutch pedal in actual MT vehicles generally have hysteresis during depressing and return operations due to the mechanical friction associated with clutch actuation and the structural characteristic of the hydraulic mechanism. The electric vehicle 10 according to the second embodiment is characterized in control to effect the pedal reaction characteristic having a hysteresis.

Figure 11:
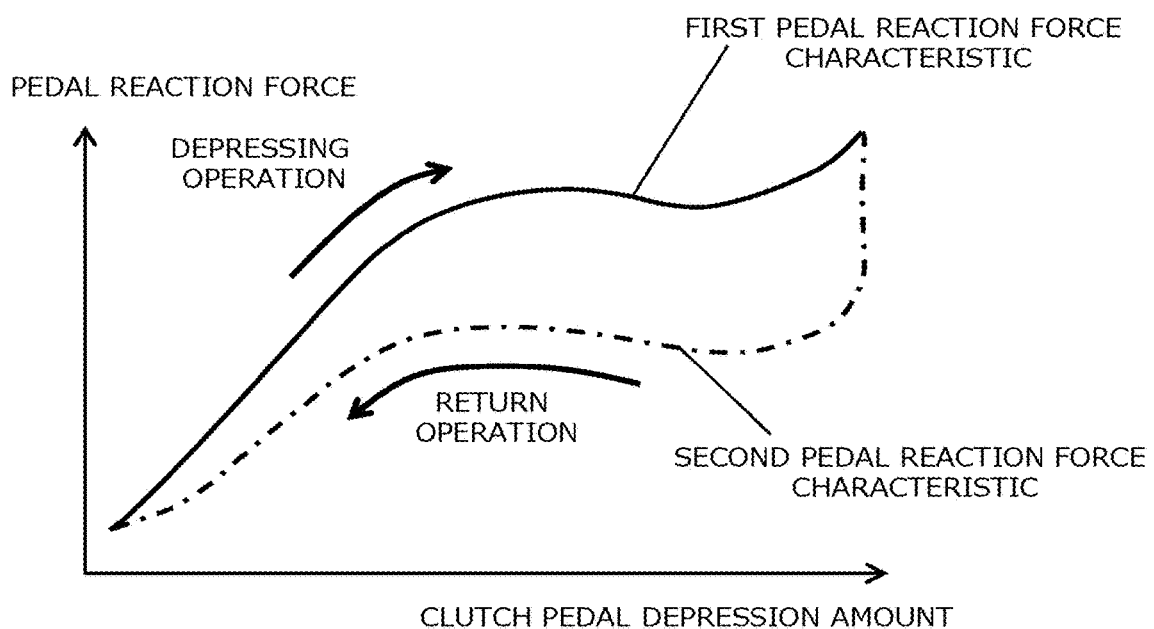
FIG. 11 is a diagram showing an example of a pedal reaction force characteristic having hysteresis.

FIG. 11 is a diagram showing an example of a pedal reaction force characteristic having hysteresis. As shown in FIG. 11, a first pedal reaction force characteristic, which is a characteristic at the time of the depressing operation of the clutch pedal, has a larger value of the pedal reaction force than a second pedal reaction force characteristic, which is a characteristic at the time of the return operation. The memory 54 stores pedal reaction force characteristic as shown in FIG. 11. When the pedal operation amount of the pseudo-clutch pedal 28 obtained from the clutch position sensor 38 is changing in the depressing direction, the pedal reaction force calculation unit 500 calculates the pedal reaction force Wpt using the first pedal reaction force characteristic. On the other hand, when the pedal operation amount of the pseudo-clutch pedal 28 is changing in the returning direction, the pedal reaction force Wpt is calculated using the second pedal reaction force characteristic. This makes it easier for the driver to enjoy the sensation of operating the clutch pedal, such as an MT vehicle, since the pedal reaction force with hysteresis is produced.

Figure 12:
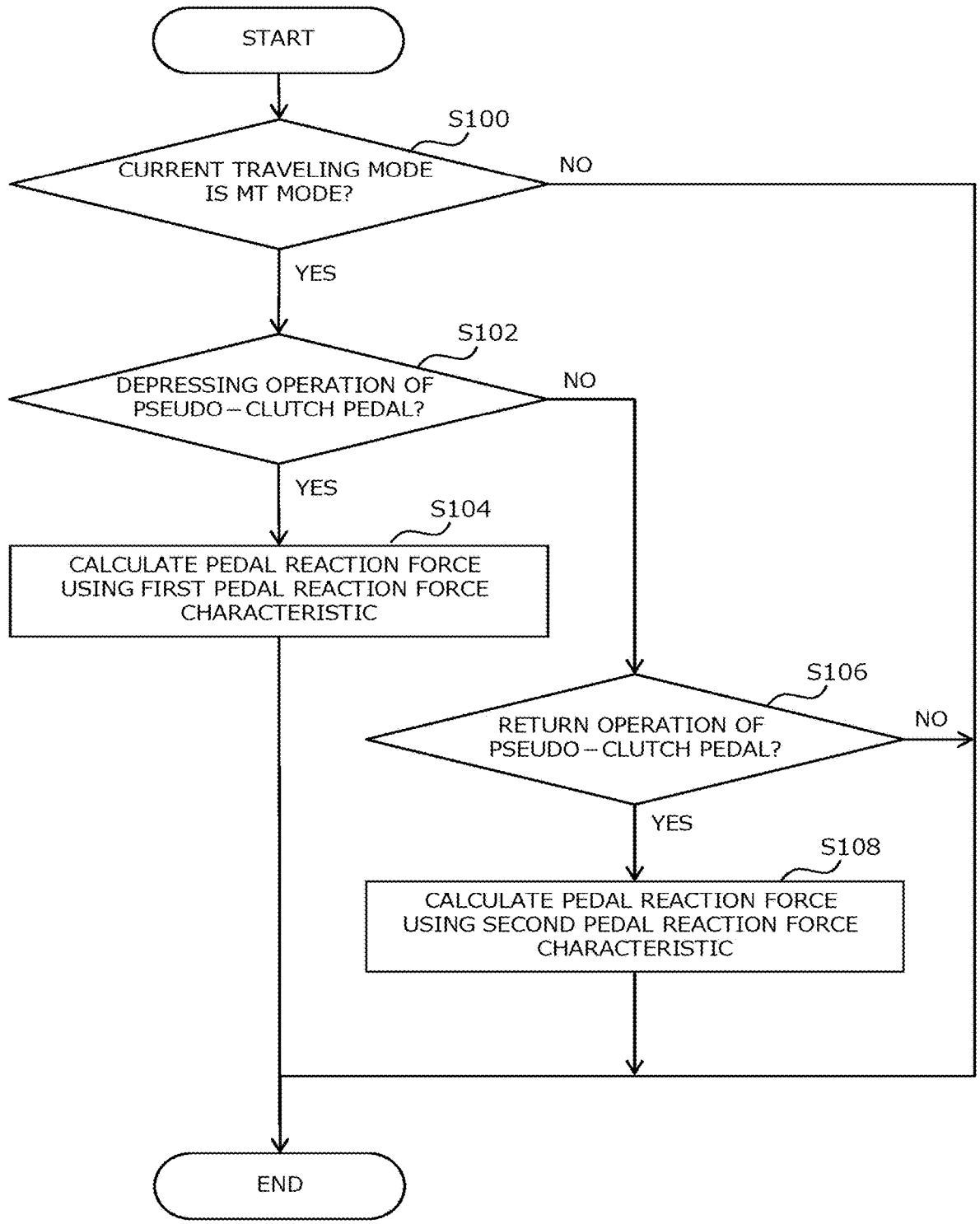
FIG. 12 is a flowchart illustrating a procedure of pedal reaction force addition control according to the second embodiment.

2-3. Calculation Procedure for Pedal Reaction Force According to Second Embodiment FIG. 12 is a flowchart illustrating a procedure of the pedal reaction force addition control according to the second embodiment. The routine shown in FIG. 12 is repeatedly executed at a predetermined control cycle in the pedal reaction force calculation unit 500 of the controller 50. In the step S100, it is determined whether the current traveling mode is the MT mode. When the current traveling mode is the EV mode, the subsequent processing is skipped.

When the current traveling mode is the MT mode, it is determined in the step S102 whether the depressing operation of the pseudo-clutch pedal 28 is being performed. When the change amount from the previous position of the clutch position detected by the clutch position sensor 38 is changing in the depressing direction, the pseudo-clutch pedal 28 is determined to be in the depressing operation by the driver.

When the pseudo-clutch pedal 28 is depressed, in the step S104, the pedal reaction force Wpt corresponding to the current pedal depression amount of the pseudo-clutch pedal 28 is calculated using the first pedal reaction force characteristic.

On the other hand, when it is determined that the pseudo-clutch pedal 28 is not depressed in the step S102, the process proceeds to step S106. In the step S106, it is determined whether a return operation of the pseudo-clutch pedal 28 is being performed. When the change amount of the clutch position detected by the clutch position sensor 38 from the previous position is changing in the returning direction, the pseudo-clutch pedal 28 is determined to be performing the return operation by the driver. On the other hand, when it is determined that the pseudo-clutch pedal 28 has not been returned, the subsequent processing is skipped.

When the pseudo-clutch pedal 28 is being returned, in the step S108, the pedal reaction force Wpt corresponding to the current pedal depressing amount of the pseudo-clutch pedal 28 is calculated using the second pedal reaction force characteristic.

2-4. Other

The electric vehicle 10 according to the above embodiment may be provided with a plurality of patterns of pedal reaction characteristic having a hysteresis. In this case, the driver may select the pattern of the desired pedal reaction characteristic by operating the pattern selection switch 46.

3. Third Embodiment 3-1. Configuration of Electric Vehicle of Third Embodiment The configuration of the electric vehicle according to the third embodiment is the same as the electric vehicle 10 of the first embodiment shown in FIG. 1. Therefore, a detailed description of the electric vehicle 10 of the third embodiment is omitted.

3-2. Features of Electric Vehicle According to Third Embodiment

In actual MT vehicles, during the return operation of the clutch pedal, a unique vibration may occur in the semi-engaged region where the clutch is in a semi-engaged state. Therefore, the electric vehicle 10 according to the third embodiment executes vibration addition control to add vibration to the pseudo-clutch pedal 28 in the half-engagement region using the pedal reaction force generator 44 in the return operation of the virtual clutch.

Figure 13:
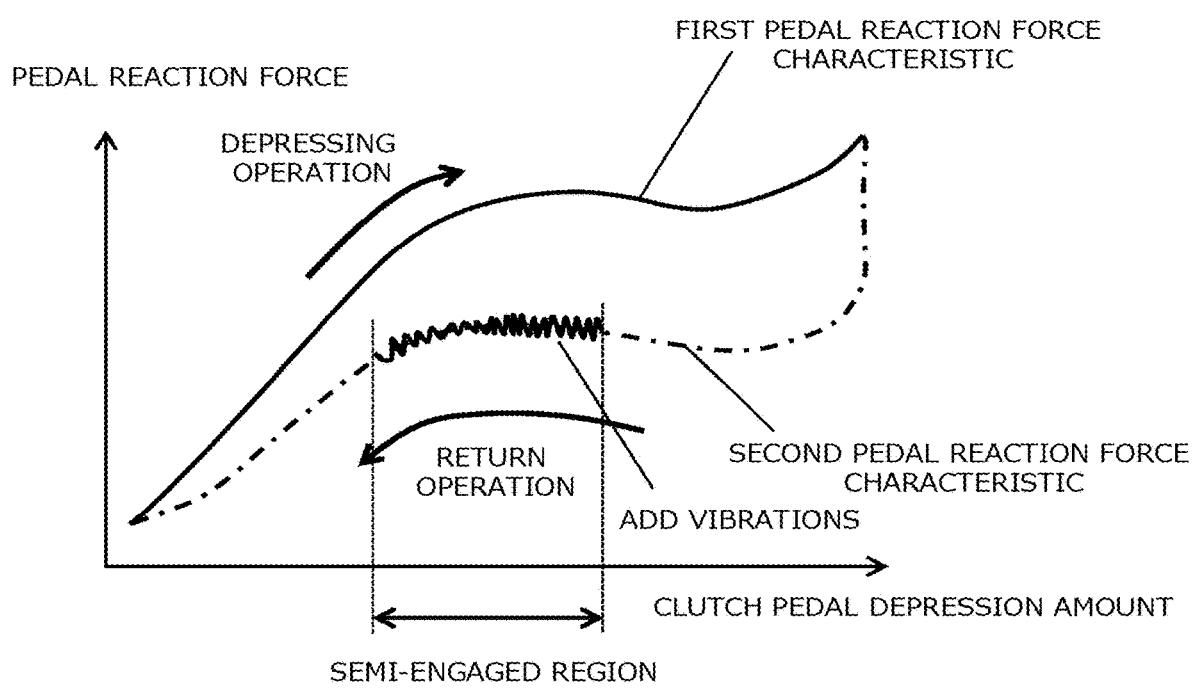
FIG. 13 is a diagram for explaining vibration addition control according to the third embodiment.

FIG. 13 is a diagram for explaining vibration addition control according to the third embodiment. As shown in FIG. 13, in the electric vehicle 10 of the third embodiment, a predetermined return operation range corresponding to the half-engaged state of the virtual clutch is predetermined. In the vibration addition control, when the operation amount of the pseudo-clutch pedal 28 belongs to the predetermined return operation range corresponding to the half-engaged state of the virtual clutch, the vibrations are added to the pseudo-clutch pedal 28 using the pedal reaction force generator 44. This allows the driver to easily enjoy the sensation of operating the clutch pedal, such as an MT vehicle.

3-3. Procedure of Vibration Addition Control According to Third Embodiment

Figure 14:
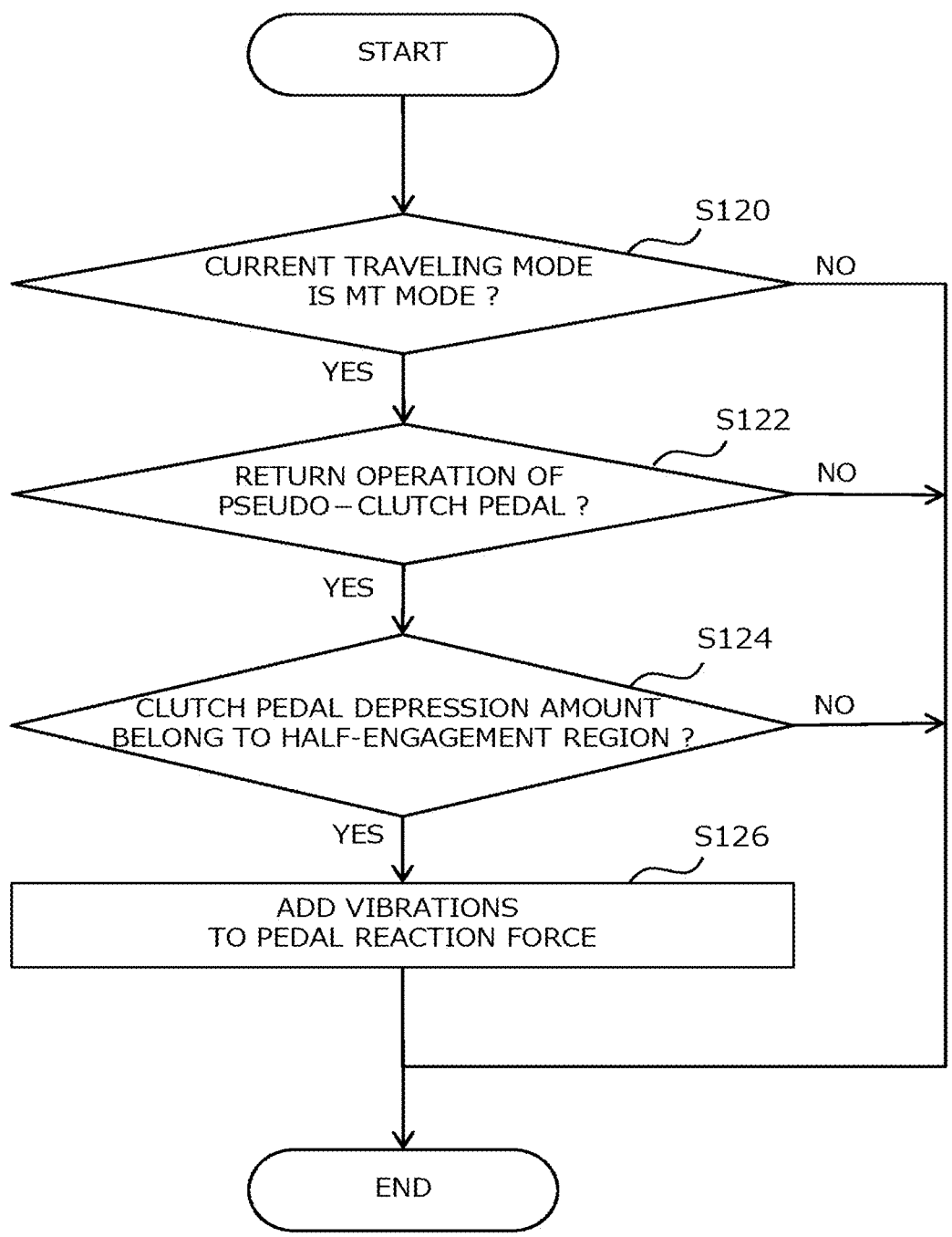
FIG. 14 is a flowchart showing the procedure of the vibration addition control according to the third embodiment.

FIG. 14 is a flowchart showing the procedure of the vibration addition control according to the third embodiment. The routine shown in FIG. 14 is repeatedly executed at a predetermined control cycle in the pedal reaction force calculation unit 500 of the controller 50. In the step S120, it is determined whether the current traveling mode is the MT mode. When the current traveling mode is the EV mode, the subsequent processing is skipped.

When the current traveling mode is the MT mode, it is determined in the step S122 whether the return operation of the pseudo-clutch pedal 28 is being performed. When the change amount of the clutch position detected by the clutch position sensor 38 from the previous position is changing in the returning direction, the pseudo-clutch pedal 28 is determined to be performing the return operation by the driver. When the return operation is not performed, the subsequent processing is skipped.

When the pseudo-clutch pedal 28 is being returned, in the step S124, it is determined whether the pedal depression amount of the pseudo-clutch pedal 28 belongs to the half-engagement region of the virtual clutch. Consequently, when the pedal depression amount belongs to the half-engaged region, the process proceeds to the next step S126. On the other hand, when the pedal depression amount does not belong to the half-engagement region, the subsequent processing is skipped. In the step S126, vibrations are added to the pedal reaction force. According to the vibration addition control described above, when the driver performs the return operation of the pseudo-clutch pedal 28, vibration is added to the pseudo-clutch pedal 28 during a period in which the pedal operation amount belongs to the half-engagement region. This allows the driver to easily enjoy the sense of vibration of a clutch pedal, such as an MT vehicle.

What is claimed is:

1. An electric vehicle using a driving force of an electric motor as a power source for traveling, the electric vehicle comprising:
    a pseudo-clutch pedal;
    a pedal reaction force generator that generates a pedal reaction force against operation of the pseudo-clutch pedal, by operation of a reaction force actuator; and
    a controller configured to decrease the driving force of the electric motor toward zero the greater a pedal operation amount of the pseudo-clutch pedal,
    wherein the controller is configured to arbitrarily set a pedal reaction force characteristic of the pedal reaction force generator by a driver.

2. The electric vehicle according to claim 1,
    wherein the controller comprises:
        a memory configured to store a plurality of pedal reaction force characteristics; and
        a processor,
    wherein, the electric vehicle includes a pattern selection switch for the user to select one pedal reaction characteristic from among the plurality of pedal reaction force characteristics, and
    wherein, the processor is configured to execute a process of controlling the pedal reaction force output by the pedal reaction force generator using the pedal reaction force characteristic selected by the pattern selection switch.

\* \* \* \* \*